United States Patent [19]

Stockstad

[11] Patent Number: 5,646,503

[45] Date of Patent: Jul. 8, 1997

[54] METHOD FOR BALANCING POWER SOURCES AND STRUCTURE THEREFOR

[75] Inventor: Troy L. Stockstad, Phoenix, Ariz.

[73] Assignee: Motorola, Inc., Schaumburg, Ill.

[21] Appl. No.: 539,207

[22] Filed: Oct. 4, 1995

[51] Int. Cl.$^6$ .............................. H01M 10/44; H02J 7/00
[52] U.S. Cl. ................... 320/13; 320/15; 320/17
[58] Field of Search ................... 320/1, 5, 6, 13, 320/15, 16, 17, 14

[56] References Cited

U.S. PATENT DOCUMENTS

| | | |
|---|---|---|
| 3,997,888 | 12/1976 | Kremer . |
| 4,021,718 | 5/1977 | Konrad . |
| 4,194,146 | 3/1980 | Patry et al. . |
| 4,238,721 | 12/1980 | DeLuca et al. ................. 320/18 |
| 4,247,812 | 1/1981 | Patry et al. . |
| 4,307,330 | 12/1981 | Belot . |
| 4,331,911 | 5/1982 | Park ................................ 320/14 |
| 5,063,340 | 11/1991 | Kalenowsky .................. 320/18 X |
| 5,284,719 | 2/1994 | Landau et al. . |
| 5,372,898 | 12/1994 | Atwater et al. . |
| 5,432,429 | 7/1995 | Armstrong, II et al. . |
| 5,440,221 | 8/1995 | Landau et al. . |
| 5,493,197 | 2/1996 | Eguchi et al. ..................... 320/5 |
| 5,504,415 | 4/1996 | Podrazhansky et al. ........... 320/18 |
| 5,528,122 | 6/1996 | Sullivan et al. .................... 320/6 |
| 5,547,775 | 8/1996 | Eguchi et al. .................. 320/17 X |

FOREIGN PATENT DOCUMENTS 4-274945  9/1992  Japan .

*Primary Examiner*—Peter S. Wong
*Assistant Examiner*—Patrick B. Law
*Attorney, Agent, or Firm*—Rennie William Dover; Ziye Zhou

[57] ABSTRACT

A power source balancing circuit (10) balances two power sources such as two battery cells (12 and 42). When the power source balancing circuit (10) is enabled, it compares a current flowing through the first battery cell (12) and a first resistor (22) with a current flowing through the second battery cell (42) and a second resistor (52). Because the resistance of the first resistor (22) is equal to that of the second resistor (52), a difference between the two currents indicates a difference between the voltages of the two battery cells (12 and 42). If a current difference larger than a predetermined limit is detected, the battery cell (12 or 42) with a higher voltage is discharged through a corresponding discharge resistor (14 or 44) by switching on a corresponding switch (16 or 46). The corresponding switch (16 or 46) is controlled by a corresponding flip-flop (32 or 62).

20 Claims, 2 Drawing Sheets

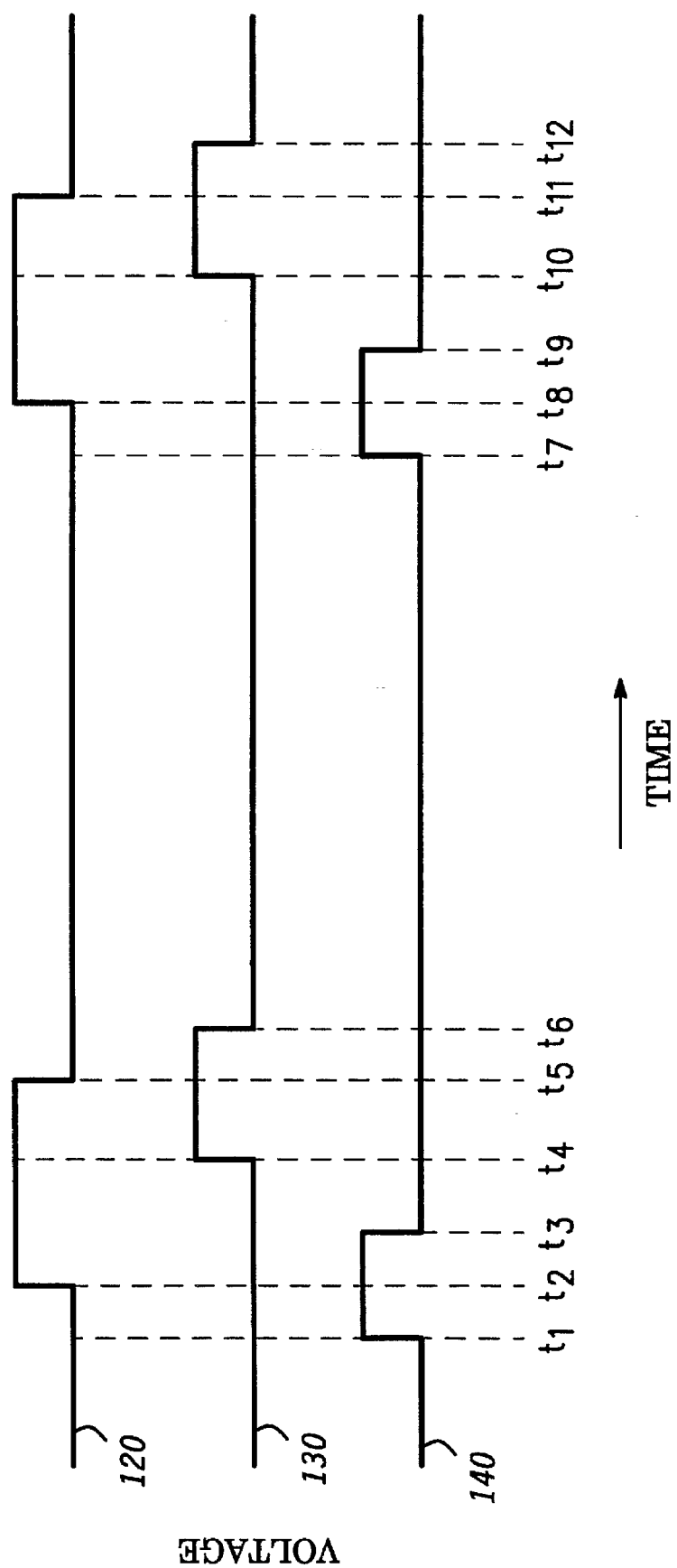

METHOD FOR BALANCING POWER SOURCES AND STRUCTURE THEREFOR

BACKGROUND OF THE INVENTION

The present invention relates, in general, to balancing power sources, and more particularly, to equalizing the voltages of battery cells in a series combination.

Battery cell balancing is required in lithium battery technology. As a battery pack of lithium battery cells in a series combination undergoes a number of charging and discharging cycles, a voltage difference is developed among the battery cells because each lithium battery cell has its own distinct charging and discharging characteristics. The voltage difference creates an imbalance condition among the battery cells, which leads to the loss of capacity in the battery pack.

In one approach for avoiding the loss of battery capacity, the battery cells in a battery pack are balanced during a charging process. The voltages of the battery cells in a battery pack are compared with one another when any one battery cell in the battery pack is measured as having a voltage equal to or greater than a predetermined over voltage limit. If all battery cells are at the over voltage limit, the battery cells in the battery pack are considered as being in balance. Otherwise, the battery cell having the highest voltage is discharged for a predetermined time duration. This approach does not allow the use of the battery pack while the battery cell is being balanced because the charging process must discontinue when any one battery cell is at the over voltage limit. Therefore, this approach does not provide for uninterrupted use of the battery pack.

Accordingly, it would be advantageous to have a battery balancing circuit and a method for balancing battery cells in a battery pack while the battery pack is idle, being charged, or being discharged, thereby providing for an uninterrupted use of the battery pack. It would be of further advantage to have a battery balancing circuit that does not drain the battery power while the balancing function is disabled.

BRIEF DESCRIPTION OF THE DRAWINGS

FIG. 2 is a timing diagram for bias, clock, and reset signals used in operating the power source balancing circuit of FIG. 1.

DETAILED DESCRIPTION OF THE DRAWINGS

Figure 1:
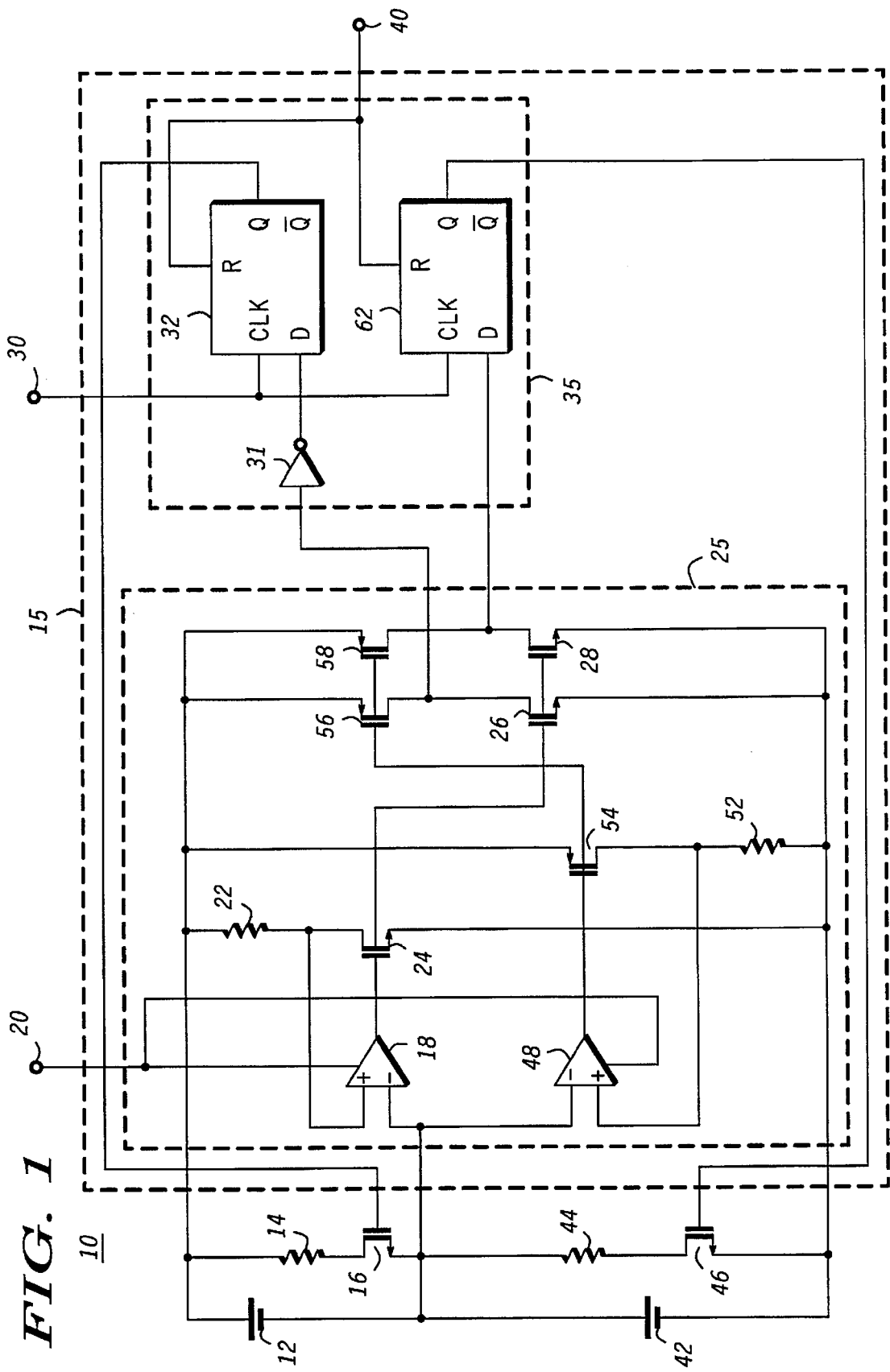
FIG. 1 is a schematic diagram of a power source balancing circuit in accordance with an embodiment of the present invention.

Generally, the present invention provides a circuit and a method for electrically balancing power sources. More particularly, power sources, such as battery cells in a battery pack, are balanced by monitoring the voltages of the battery cells and discharging the battery cell having the highest voltage relative to other battery cells in the battery pack.

FIG. 1 is a schematic diagram of a power source balancing circuit 10 in accordance with an embodiment of the present invention. Power source balancing circuit 10 monitors and balances the voltages of two power sources. By way of example, the two power sources are two battery cells, 12 and 42, configured such that a negative electrode of battery cell 12 is connected to a positive electrode of battery cell 42.

Power source balancing circuit 10 includes two discharge resistors, 14 and 44, and two insulated gate field effect transistors (FETs), 16 and 46. FET 16 serves as a discharge switch that completes a current path for discharging battery cell 12. A source electrode of FET 16 is connected to the negative electrode of battery cell 12. A drain electrode of FET 16 is coupled to a positive electrode of battery cell 12 via discharge resistor 14. FET 46 serves as a discharge switch that completes a current path for discharging battery cell 42. A source electrode of FET 46 is connected to a negative electrode of battery cell 42. A drain electrode of FET 46 is coupled to the positive electrode of battery cell 42 via discharge resistor 44. It should be understood that the discharge switches are not limited to being insulated gate field effect transistors. Any switching device that is capable of being switched on and off via a control signal can replace FET 16 or FET 46. Some examples of such a switching device include bipolar transistors, metal semiconductor field effect transistors, and the like. As those skilled in the art are aware, when using a field effect transistor as a switch, a gate electrode of the field effect transistor serves as a control electrode of the switch, and source and drain electrodes of the field effect transistor serve as current conducting electrodes of the switch.

Power source balancing circuit 10 also includes a balancing element 15 for monitoring battery cell 12 and battery cell 42. When an imbalance is detected, balancing element 15 sends a control signal to the gate electrode of FET 16 or to the gate electrode of FET 46 in accordance with the voltages of battery cells 12 and 42. Balancing element 15 includes a sensing element 25 and a control element 35. Sensing element 25 monitors battery cells 12 and 42, and detects an imbalance condition when one battery cell has a higher voltage than the other. Control element 35 receives signals from sensing element 25. If an imbalance is detected, control element 35 either switches on FET 16 to discharge battery cell 12 or switches on FET 46 to discharge battery cell 42 depending on the voltage of battery cell 12 relative to the voltage of battery cell 42. If battery cells 12 and 42 are in balance, control element 35 places both FETs 16 and 46 in non-conductive states.

Sensing element 25 includes two operational amplifiers, 18 and 48, each having a non-inverting input, an inverting input, an output, and a biasing port. The inverting input of amplifier 18 serves as a common input of sensing element 25 and is connected to the negative electrode of battery cell 12. The biasing port of amplifier 18 is connected to a terminal port 20 for receiving a biasing signal. A resistor 22 has a first electrode connected to the positive electrode of battery cell 12 and a second electrode connected to the non-inverting input of amplifier 18. The first electrode of resistor 22 serves as a first input of sensing element 25. The inverting input of amplifier 48 is connected to the common input of sensing element 25 and to the positive electrode of battery cell 42. The biasing port of amplifier 48 is connected to terminal port 20 for receiving the biasing signal. A resistor 52 has a first electrode connected to the negative electrode of battery cell 42 and a second electrode connected to the non-inverting input of amplifier 48. The first electrode of resistor 52 serves as a second input of sensing element 25. The resistance of resistor 22 is designed to be equal to the resistance of resistor 52. Sensing element 25 further includes two current mirrors. The first current mirror includes three n-channel FETs, 24, 26, and 28. FET 24 has a gate electrode connected to the output of amplifier 18, a source electrode connected to the negative electrode of battery cell 42, and a drain electrode connected to the non-inverting input of amplifier 18. FET 26 has a gate electrode connected to the gate electrode of FET 24, a source electrode connected to the source electrode of FET 24, and a drain electrode serving as a first output of sensing element 25. FET 28 has a gate electrode connected to the gate electrode of FET 24, a source electrode connected to the source electrode of FET 24, and a drain electrode serving as a second output of sensing element 25. The second current mirror includes three p-channel FETs, 54, 56, and 58. FET 54 has a gate electrode connected to the output of amplifier 48, a source electrode connected to the positive electrode of battery cell 12, and a drain electrode connected to the non-inverting input of amplifier 48. FET 56 has a gate electrode connected to the gate electrode of FET 54, a source electrode connected to the source electrode of FET 54, and a drain electrode connected to the drain electrode of FET 26. FET 58 has a gate electrode connected to the gate electrode of FET 54, a source electrode connected to the source electrode of FET 54, and a drain electrode connected to the drain electrode of FET 28. It should be understood that the structures of the current mirrors in sensing element 25 are not limited to those illustrated in FIG. 1. For example, the field effect transistors in the current mirrors can be replaced by bipolar transistor circuits. Because FETs 24, 26, and 28 form a current mirror, they are of the same type. Likewise, the three transistors in the second current mirror, FETs 54, 56, and 58 are of the same type.

Control element 35 includes an inverter 31, a flip-flop 32, and a flip-flop 62. An input of inverter 31 serves as a first input of control element 35 and is connected to the first output of sensing element 25. Flip-flop 32 has a clock input connected to a node 30 for receiving a clock signal, a reset input connected to a node 40 for receiving a reset signal, a data input connected to an output of inverter 31, and an output connected to a gate electrode of FET 16. The output of flip-flop 32 serves as a first output of control element 35. Flip-flop 62 has a clock input connected to node 30 for receiving the clock signal, a reset input connected to node 40 for receiving the reset signal, a data input connected to the second output of sensing element 25, and an output connected to a gate electrode of FET 46. The data input of flip-flop 62 serves as a second input of control element 35 and the output of flip-flop 62 serves as a second output of control element 35.

FIG. 2 is a timing diagram illustrating the timing relationship among a biasing signal 120 such as, for example, the current bias of operational amplifiers 18 and 48 of FIG. 1, a clock signal 130, and a reset signal 140. Biasing signal 120 is applied to terminal port 20 of FIG. 1. Clock signal 130 is applied to node 30 of FIG. 1. Reset signal 140 is applied to node 40 of FIG. 1. Biasing signal 120, clock signal 130, and reset signal 140 have the same time period of, for example, one second. A time $t_1$ represents a rising edge of reset signal 140 in a period. A time $t_2$ represents a rising edge of biasing signal 120 in the period. A time $t_3$ represents a falling edge of reset signal 140 in the period. A time $t_4$ represents a rising edge of clock signal 130 in the period. A time $t_5$ represents a falling edge of biasing signal 120 in the period. A time $t_6$ represents a falling edge of clock signal 130 in the period. A time $t_7$ represents a rising edge of reset signal 140 in a subsequent period. A time $t_8$ represents a rising edge of biasing signal 120 in the subsequent period. A time $t_9$ represents a falling edge of reset signal 140 in the subsequent period. A time $t_{10}$ represents a rising edge of clock signal 130 in the subsequent period. A time $t_{11}$ represents a falling edge of biasing signal 120 in the subsequent period. A time $t_{12}$ represents a falling edge of clock signal 130 in the subsequent period. A time interval between time $t_1$ and time $t_7$ represents the period of the applied signals, e.g., one second. Likewise, time intervals between times $t_2$ and $t_8$, between times $t_3$ and $t_9$, between times $t_4$ and $t_{10}$, between times $t_5$ and $t_{11}$, and between times $t_6$ and $t_{12}$ also represent the period of the applied signals. A time interval between time $t_2$ and time $t_5$ represents a duration of, for example, one milli-second, for biasing signal 120. It should be understood that the period of biasing signal 120, clock signal 130, and reset signal 140 is not limited to being one second. Shorter periods provide more frequent monitoring of battery cell 12 and battery cell 42 of power source balancing circuit 10 in FIG. 1, but may drain the battery power faster. Likewise, the duration of biasing signal 120 is not limited to being one milli-second. A longer duration for biasing signal 120 drains more battery power, but may offer more accurate assessment of the conditions of battery cell 12 and battery cell 42. A time duration of clock signal 130 and a time duration of reset signal 140 may also vary. In accordance with the embodiment of the present invention as illustrated in FIG. 2, time $t_1$, which represents a rising edge of reset signal 140, precedes time $t_2$, which represents a rising edge of the biasing signal 120. Time $t_3$, which represents a falling edge of reset signal 140 precedes time $t_4$, which represents a rising edge of clock signal 130. The rising edge of clock signal 130, time $t_4$, is after the rising edge of biasing signal 120, time $t_2$, and before the falling edge of biasing signal 120, time $t_5$.

In operation, flip-flops 32 and 62 of FIG. 1 are reset by the rising edge of reset signal 140 applied at node 40 at time $t_1$. Resetting flip-flops 32 and 62 results in a logic low voltage level appearing at the gate electrodes of FETs 16 and 46. The logic low voltage level develops a voltage across the gate and source electrodes of FETs 16 and 46 lower than the threshold voltages of FETs 16 and 46. Thus, FETs 16 and 46 are non-conductive.

At time $t_2$, amplifier 18 and amplifier 48 are enabled by biasing signal 120 applied at terminal port 20. The voltage of battery cell 12 is applied across resistor 22 and the inputs of amplifier 18. The voltage across resistor 22 is determined by the current flowing through resistor 22. The current flowing through resistor 22 is equal to the current flowing through the drain and source electrodes of FET 24, which current is determined by the output voltage of amplifier 18. If a small current is initially flowing through resistor 22, the small current develops a small voltage across resistor 22. Because resistor 22 and the inputs of amplifier 18 share the voltage across battery cell 12, a large positive voltage develops across the inputs of amplifier 18, wherein the positive voltage indicates that the potential at the non-inverting input of amplifier 18 is higher than the potential at the inverting input of amplifier 18. A positive voltage at the inputs of amplifier 18 raises the potential at the output of amplifier 18, thereby increasing the gate-source voltage of FET 24. Thus, FET 24 becomes more conductive. As the current flowing through resistor 22 and FET 24 increases, the voltage across resistor 22 increases, which results in a decrease in the positive voltage across the inputs of amplifier 18. The potential at the output of amplifier 18 continues to increase as long as there is a positive voltage across the inputs of amplifier 18. The process continues until the voltage across the inputs of amplifier 18 is zero and the voltage across resistor 22 is equal to the voltage of battery cell 12. Likewise, the voltage of battery cell 42 is applied across the inputs of amplifier 48 and resistor 52. The voltage across resistor 52 is determined by the current flowing through resistor 52. The current flowing through resistor 52 is equal to the current flowing through the drain and source electrodes of FET 54, which current is determined by the output voltage of amplifier 48. If a small current is initially flowing through resistor 52, the small current develops a small voltage across resistor 52. Because resistor 52 and the inputs of amplifier 48 share the voltage across battery cell 42, a large negative voltage develops across the inputs of amplifier 48, wherein the negative voltage indicates that the potential at the inverting input of amplifier 48 is higher than the potential at the non-inverting input of amplifier 48. A negative voltage at the inputs of amplifier 48 lowers the potential at the output of amplifier 48, thereby increasing an absolute value of the gate-source voltage of FET 54. Thus, FET 54 becomes more conductive. As the current flowing through resistor 52 and FET 54 increases, the voltage across resistor 52 increases, which results in a decrease in the negative voltage across the inputs of amplifier 48. The potential at the output of amplifier 48 continues to decrease as long as there is a negative voltage across the inputs of amplifier 48. The process continues until the voltage across the inputs of amplifier 48 is zero and the voltage across resistor 52 is equal to the voltage of battery cell 42. Because the resistance of resistor 22 is equal to the resistance of resistor 52, the ratio of the current flowing through FET 24 to the current flowing through FET 54 is equal to the ratio of the voltage of battery cell 12 to the voltage of battery cell 42.

FETs 26 and 24 form a current mirror, and FETs 56 and 54 form another current mirror. FET 26 is designed to have the same current conducting capacity as that of FET 24. This can be achieved by, for example, designing the ratio of channel width to channel length (W/L) of FET 26 to be equal to the W/L ratio of FET 24. FET 56 is designed to have a current conducting capacity higher than that of FET 54 by a predetermined amount such as, for example, one percent. This is achieved by, for example, designing the W/L ratio of FET 56 to be larger than the W/L ratio of FET 54 by one percent. The current flowing through FET 26 is always equal to the current flowing through FET 56 because FETs 26 and 56 are in a series combination.

FETs 28 and 24 form a current mirror, and FETs 58 and 54 form another current mirror. FET 28 is designed to have a current conducting capacity higher than that of FET 24 by a predetermined amount such as, for example, one percent. FET 58 is designed to have the same current conducting capacity as that of FET 54. The current flowing through FET 28 is always equal to the current flowing through FET 58 because FETs 28 and 58 are in a series combination.

If battery cell 12 and battery cell 42 are substantially in balance with each other, the current flowing through FET 24 is substantially equal to the current flowing through FET 54, within a range determined by the matching among FETs 24, 26, and 28, and the matching among FETs 54, 56, and 58. Because of the higher current conducting capacity of FET 56 than that of FET 54, the resistance between the source and drain electrodes of FET 56 is smaller than the resistance between the drain and source electrodes of FET 26. The voltage across the source and drain electrodes of FET 56 is smaller than the voltage across the drain and source electrodes of FET 26. The potential at the drain electrode of FET 56 and the input of inverter 31 is at a high voltage level. The high voltage level at the input of inverter 31 is inverted by inverter 31, resulting in a logic low voltage level at the data input of flip-flop 32. Likewise, because of the higher current conducting capacity of FET 28 than that of FET 24, the resistance between the drain and source electrodes of FET 28 is smaller than the resistance between the source and drain electrodes of FET 58. The voltage across the drain and source electrodes of FET 28 is smaller than the voltage across the source and drain electrodes of FET 58. The potential at the drain electrode of FET 28 is at a low voltage level, resulting in a logic low voltage level appearing at the data input of flip-flop 62. At time $t_4$, the rising edge clock signal 130 is transmitted to the clock input of flip-flop 32 and to the clock input of flip-flop 62. The logic low voltage levels at the data inputs of flip-flops 32 and 62 are transmitted to the gate electrodes of FETs 16 and 46, respectively. Because the gate electrodes of FETs 16 and 46 are at the low voltage levels, FETs 16 and 46 are non-conductive. Therefore, neither battery cell 12 nor battery cell 42 is discharged.

If the voltage of battery cell 12 is higher than the voltage of battery cell 42, the current flowing through FET 24 is larger than the current flowing through FET 54. Because the current conducting capacity of FET 56 is larger than that of FET 54 by one percent, the potential at the drain electrode of FET 56 switches to a low voltage level when the current flowing through FET 24 exceeds the current flowing through FET 54 by at least one percent. The low voltage level at the input of inverter 31 is inverted by inverter 31, resulting in a logic high voltage level appearing at the data input of flip-flop 32. Because of the higher current conducting capacity of FET 28 than that of FET 24, the potential at the drain electrode of FET 28 is at a low voltage level, resulting in a logic low voltage level appearing at the data input of flip-flop 62. At time $t_4$, the rising edge of clock signal 130 is transmitted to the clock input of flip-flop 32 and to the clock input of flip-flop 62. Flip-flop 32 transmits the high voltage level at its data input to the gate electrode of FET 16, resulting in the gate-source voltage of FET 16 being higher than the threshold voltage of FET 16. Thus, FET 16 becomes conductive, resulting in battery cell 12 being discharged through discharge resistor 14. The discharge of battery cell 12 continues until flip-flop 32 is reset at time $t_7$ in the subsequent period. Flip-flop 62 transmits the low voltage level at its data input to the gate electrode of FET 46, resulting in the gate-source voltage of FET 46 being lower than the threshold voltage of FET 46. Thus, FET 46 is non-conductive and battery cell 42 is not being discharged.

If voltage of battery cell 12 is lower than the voltage of battery cell 42, the current flowing through FET 24 is smaller than the current flowing through FET 54. Because of the higher current conducting capacity of FET 56 than that of FET 54, the potential at the drain electrode of FET 56 is at a high voltage level. The high voltage level at the input of inverter 31 is inverted by inverter 31, resulting in a logic low voltage level appearing at the data input of flip-flop 32. Because the current conducting capacity of FET 28 is larger than that of FET 24 by one percent, the potential at the drain electrode of FET 28 switches to a high voltage level when the current flowing through FET 24 is smaller than the current flowing through FET 54 by at least one percent, resulting in a logic high voltage level appearing at the data input of flip-flop 62. At time $t_4$, the rising edge of clock signal 130 is transmitted to the clock input of flip-flop 32 and to the clock input of flip-flop 62. Flip-flop 32 transmits the low voltage level at its data input to the gate electrode of FET 16, resulting in the gate-source voltage of FET 16 being lower than the threshold voltage of FET 16. Thus, FET 16 is non-conductive and battery cell 12 is not being discharged. Flip-flop 62, transmits the high voltage level at its data input to the gate electrode of FET 46, resulting in the gate-source voltage of FET 46 being higher than the threshold voltage of FET 46. Thus, FET 46 becomes conductive, resulting in battery cell 42 being discharged through discharge resistor 44. The discharge of battery cell 42 continues until flip-flop 62 is reset at time $t_7$ in the subsequent period.

At time $t_5$, amplifiers 18 and 48 are turned off by the falling edge of biasing signal 120, resulting in sensing element 25 being disabled. While disabled, sensing element 25 does not drain the battery power from battery cells 12 and 42.

At time $t_7$ of the subsequent period, a rising edge of reset signal 140 resets flip-flops 32 and 62 to a logic low state, regardless of their previous states. Flip-flops 32 and 62 place FETs 16 and 46, respectively, in non-conductive states. Power source balancing circuit 10 is in the same state as the state of power source balancing circuit 10 at time $t_1$.

Although power source circuit 10 of FIG. 1 is illustrated as balancing two battery cells, it is not intended as a limitation of the present invention. A power source balancing circuit that balances more than two battery cells can be constructed from power source circuit 10 by including additional discharge resistors, discharge switches, operational amplifiers, current mirrors, and flip-flops in the circuits.

By now it should be appreciated that a method and a circuit for balancing power sources has been provided. The power source balancing circuit in accordance with the present invention is sufficiently small to be built on an integrated circuit chip and placed in the battery pack. The method for balancing power sources in accordance with the present invention enables the circuit for a short time interval for every time period. An important feature of the present invention is that battery power is not drained when the power source balancing circuit is not enabled. Therefore, the present invention provides an energy efficient power source balancing circuit. Furthermore, the power source balancing process of the present invention permits uninterrupted use of the battery pack.

I claim:

1. A method for balancing power sources, comprising the steps of:
   generating a first current by applying a voltage of a first power source across a first resistor having a predetermined resistance value;
   generating a second current by applying a voltage of a second power source across a second resistor having the predetermined resistance value;
   discharging the first power source in response to the first current being greater than the second current by a first amount, the first amount being more than a first predetermined current value; and
   discharging the second power source in response to the second current being greater than the first current by a second amount, the second amount being more than a second predetermined current value.

2. The method for balancing power sources as claimed in claim 1, wherein the step of discharging the first power source includes the step of generating a current path through a third resistor and the first power source.

3. The method for balancing power sources as claimed in claim 1, wherein the step of discharging the second power source includes the step of generating a current path through a fourth resistor and the second power source.

4. The method for balancing power sources as claimed in claim 1, wherein the step of discharging the first power source includes the steps of:
   generating a third current substantially equal to the first current;
   generating a fourth current greater than the second current by the first predetermined current value; and
   discharging the first power source in response to the third current being greater than the fourth current.

5. The method for balancing power sources as claimed in claim 1, wherein the step of discharging the second power source includes the steps of:
   generating a fifth current greater than the first current by the second predetermined current value;
   generating a sixth current substantially equal to the second current; and
   discharging the second power source in response to the sixth current being greater than the fifth current.

6. The method for balancing power sources as claimed in claim 1, wherein the step of generating a first current includes the step of generating the first current for a predetermined time interval in every time period of a predetermined duration.

7. The method for balancing power sources as claimed in claim 6, wherein the step of discharging the first power source includes the step of interrupting the discharge of the first power source before the step of generating the first current in a subsequent period.

8. The method for balancing power sources as claimed in claim 6, wherein the step of generating a second current includes the step of generating the second current for the predetermined time interval in every time period of the predetermined duration simultaneously to the step of generating the first current.

9. The method for balancing power sources as claimed in claim 8, wherein the step of discharging the second power source includes the step of interrupting the discharge of the second power source before the step of generating the second current in a subsequent period.

10. A power source balancing circuit, comprising:
   a first discharge switch having a control electrode, a first current conducting electrode, and a second current conducting electrode;
   a first discharge resistor having a first electrode and a second electrode, wherein the second electrode is coupled to the second current conducting electrode of the first discharge switch;
   a second discharge switch having a control electrode, a first current conducting electrode, and a second current conducting electrode;
   a second discharge resistor having a first electrode and a second electrode, wherein the first electrode is coupled to the first current conducting electrode of the first discharge switch and the second electrode is coupled to the second current conducting electrode of the second discharge switch;
   a sensing element having a first input, a second input, a common input, a first output, and a second output, wherein the first input is coupled to the first electrode of the first discharge resistor, the second input is coupled to the first current conducting electrode of the second discharge switch, and the common input is coupled to the first electrode of the second discharge resistor; and
   an control element having, a first input, a second input, a first output, and a second output, wherein the first input is coupled to the first output of the sensing element, the second input is coupled to the second output of the sensing element, the first output is coupled to the control electrode of the first discharge switch, and the second output is coupled to the control electrode of the second discharge switch.

11. The power source balancing circuit of claim 10, further comprising:
   a first battery having a positive electrode and a negative electrode, wherein the positive electrode is coupled to the first electrode of the first discharge resistor and the negative electrode is coupled to the first current conducting electrode of the first discharge switch; and a second battery having a positive electrode and a negative electrode, wherein the positive electrode is coupled to the first electrode of the second discharge resistor and the negative electrode is coupled to the first current conducting electrode of the second discharge switch.

12. The power source balancing circuit of claim 10, wherein the first discharge switch and the second discharge switch are insulated gate field effect transistors.

13. The power source balancing circuit of claim 10, wherein the sensing element includes:

a first resistor having a first electrode and a second electrode, wherein the first electrode serves as the first input of the sensing element;

a second resistor having a first electrode and a second electrode, wherein the first electrode serves as the second input of the sensing element;

a first operational amplifier having a first input, a second input, and an output, wherein the first input is coupled to the second electrode of the first resistor and the second input is coupled to the common input of the sensing element;

a second operational amplifier having a first input, a second input, and an output, wherein the first input is coupled to the second electrode of the second resistor and the second input is coupled to the common input of the sensing element;

a first transistor of a first type having a control electrode, a first current conducting electrode, and a second current conducting electrode, wherein the control electrode is coupled to the output of the first operational amplifier, the first current conducting electrode is coupled to the first electrode of the second resistor, and the second current conducting electrode is coupled to the second electrode of the first resistor;

a second transistor of a second type having a control electrode, a first current conducting electrode, and a second current conducting electrode, wherein the control electrode is coupled to the output of the second operational amplifier, the first current conducting electrode is coupled to the first electrode of the first resistor, and the second current conducting electrode is coupled to the second electrode of the second resistor;

a third transistor of the first type having a control electrode, a first current conducting electrode, and a second current conducting electrode, wherein the control electrode is coupled to the control electrode of the first transistor, the first current conducting electrode is coupled to the first electrode of the second resistor, and the second current conducting electrode is coupled to the first output of the sensing element;

a fourth transistor of the second type having a control electrode, a first current conducting electrode, and a second current conducting electrode, wherein the control electrode is coupled to the control electrode of the second transistor, the first current conducting electrode is coupled to the first electrode of the first resistor, and the second current conducting electrode is coupled to the first output of the sensing element;

a fifth transistor of the first type having a control electrode, a first current conducting electrode, and a second current conducting electrode, wherein the control electrode is coupled to the control electrode of the first transistor, the first current conducting electrode is coupled to the first electrode of the second resistor, and the second current conducting electrode is coupled to the second output of the sensing element; and a sixth transistor of the second type having a control electrode, a first current conducting electrode, and a second current conducting electrode, wherein the control electrode is coupled to the control electrode of the second transistor, the first current conducting electrode is coupled to the first electrode of the first resistor, and the second current conducting electrode is coupled to the second output of the sensing element.

14. The power source balancing circuit of claim 13, wherein the first transistor is an n-channel insulated gate field effect transistor and the second transistor is a p-channel insulated gate field effect transistor.

15. The power source balancing circuit of claim 13, wherein a resistance of the first resistor and is equal to a resistance of the second resistor.

16. The power source balancing circuit of claim 13, wherein the sensing element further has a biasing terminal coupled for transmitting a biasing signal to the first operational amplifier and to the second operational amplifier.

17. The power source balancing circuit of claim 10, wherein the control element includes:

an inverter having an input and an output, wherein the input serves as the first input of the control element;

a first flip-flop having a clock input, a reset input, a data input, and an output, wherein the clock input is coupled for receiving a clock signal, the reset input is coupled for receiving a reset signal, the data input is coupled to the output of the inverter, and the output serves as the first output of the control element; and a second flip-flop having a clock input, a reset input, a data input, and an output, wherein the clock input is coupled for receiving the clock signal, the reset input is coupled for receiving the reset signal, the data input serves as the second input of the control element, and the output serves as the second output of the control element.

18. A battery balancing circuit, comprising:

a first battery cell having a positive electrode and a negative electrode;

a second battery cell having a positive electrode and a negative electrode, wherein the positive electrode is coupled to the negative electrode of the first battery cell;

a first discharge resistor having a first electrode and a second electrode, wherein the first electrode is coupled to the positive electrode of the first battery cell;

a first discharge switch having a control electrode, a first current conducting electrode, and a second current conducting electrode, wherein the first current conducting electrode is coupled to the second electrode of the first discharge resistor and the second current conducting electrode is coupled to the negative electrode of the first battery cell;

a second discharge resistor having a first electrode and a second electrode, wherein the first electrode is coupled to the positive electrode of the second battery cell;

a second discharge switch having a control electrode, a first current conducting electrode, and a second current conducting electrode, wherein the first current conducting electrode is coupled to the second electrode of the second discharge resistor and the second current conducting electrode is coupled to the negative electrode of the second battery cell; and a balancing element having a clock input, a first input, a second input, a common input, a first output, and a second output, wherein the clock input is coupled for receiving a clock signal, the first input is coupled to the positive electrode of the first battery cell, the second input is coupled to the negative electrode of the second battery cell, the common input is coupled to the negative electrode of the first battery cell, the first output is coupled to the control electrode of the first discharge switch, and the second output is coupled to the control electrode of the second discharge switch.

19. The battery balancing circuit of claim 18, wherein the balancing element includes:

a first resistor having a first electrode and a second electrode, wherein the first electrode serves as the first input of the balancing element;

a second resistor having a first electrode and a second electrode, wherein the first electrode serves as the second input of the balancing element;

a first operational amplifier having a first input, a second input, and an output, wherein the first input is coupled to the second electrode of the first resistor and the second input is coupled to the common input of the balancing element;

a second operational amplifier having a first input, a second input, and an output, wherein the first input is coupled to the second electrode of the second resistor and the second input is coupled to the common input of the balancing element;

a first transistor of a first type having a control electrode, a first current conducting electrode, and a second current conducting electrode, wherein the control electrode is coupled to the output of the first operational amplifier, the first current conducting electrode is coupled to the first electrode of the second resistor, and the second current conducting electrode is coupled to the second electrode of the first resistor;

a second transistor of a second type having a control electrode, a first current conducting electrode, and a second current conducting electrode, wherein the control electrode is coupled to the output of the second operational amplifier, the first current conducting electrode is coupled to the first electrode of the first resistor, and the second current conducting electrode is coupled to the second electrode of the second resistor;

a third transistor of the first type having a control electrode, a first current conducting electrode, and a second current conducting electrode, wherein the control electrode is coupled to the control electrode of the first transistor and the first current conducting electrode is coupled to the first electrode of the second resistor;

a fourth transistor of the second type having a control electrode, a first current conducting electrode, and a second current conducting electrode, wherein the control electrode is coupled to the control electrode of the second transistor, the first current conducting electrode is coupled to the first electrode of the first resistor, and the second current conducting electrode is coupled to the second current conducting electrode of the third transistor;

a fifth transistor of the first type having a control electrode, a first current conducting electrode, and a second current conducting electrode, wherein the control electrode is coupled to the control electrode of the first transistor and the first current conducting electrode is coupled to the first electrode of the second resistor;

a sixth transistor of the second type having a control electrode, a first current conducting electrode, and a second current conducting electrode, wherein the control electrode is coupled to the control electrode of the second transistor, the first current conducting electrode is coupled to the first electrode of the first resistor, and the second current conducting electrode is coupled to the second current conducting electrode of the fifth transistor;

an inverter having an input and an output, wherein the input is coupled to the second current conducting electrode of the third transistor;

a first flip-flop having a clock input, a reset input, a data input, and an output, wherein the clock input is coupled to the clock input of the balancing element, the reset input is coupled for receiving a reset signal, the data input is coupled to the output of the inverter, and the output is coupled to the first output of the balancing element; and a second flip-flop having a clock input, a reset input, a data input, and an output, wherein the clock input is coupled to the clock input of the balancing element, the reset input is coupled for receiving the reset signal, the data input is coupled to the second current conducting electrode of the fifth transistor, and the output is coupled to the second output of the balancing element.

20. The battery balancing circuit of claim 19, wherein the first transistor is an n-channel insulated gate field effect transistor and the second transistor is a p-channel insulated gate field effect transistor.

* * * * *